US012643614B2

(12) United States Patent
Matsuoka et al.

(10) Patent No.: US 12,643,614 B2
(45) Date of Patent: Jun. 2, 2026

(54) METAL JOINED BODY AND PRODUCTION METHOD THEREFOR

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Hideaki Matsuoka, Nagakute (JP); Hiroaki Kadoura, Nagakute (JP); Takashi Asada, Nagakute (JP); Hiroyuki Mori, Nagakute (JP); Tatsuyuki Amago, Nagakute (JP); Ayaka Kagami, Inazawa (JP); Shuhei Ogura, Nagakute (JP); Tomohiko Sekiguchi, Nagakute (JP); Kyosuke Izuno, Toyota (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 783 days.

(21) Appl. No.: 17/884,797

(22) Filed: Aug. 10, 2022

(65) Prior Publication Data

US 2023/0139132 A1      May 4, 2023

(30) Foreign Application Priority Data

Oct. 29, 2021      (JP) ................................ 2021-177025

(51) Int. Cl.
B62D 29/00 (2006.01)
B23K 11/00 (2006.01)
(Continued)

(52) U.S. Cl.
CPC ........ B62D 29/007 (2013.01); B23K 11/0026 (2013.01); B23K 11/115 (2013.01);
(Continued)

(58) Field of Classification Search
CPC ... B23K 11/0026; B23K 11/115; B23K 11/20; B23K 11/3018; B23K 2101/006;
(Continued)

(56) References Cited

U.S. PATENT DOCUMENTS

| | | | |
|---|---|---|---|
| 10,173,281 B2 | 1/2019 | Sakurai et al. | |
| 2005/0218121 A1* | 10/2005 | Hayashi | ................ B32B 15/012 |
| | | | 428/653 |

(Continued)

FOREIGN PATENT DOCUMENTS

| | | | |
|---|---|---|---|
| JP | 2006-289452 A | | 10/2006 |
| JP | 2006289452 | * | 10/2006 |

(Continued)

OTHER PUBLICATIONS

Jul. 30, 2024 Office Action issued in Japanese Patent Application No. 2021-177025.

*Primary Examiner* — Ibrahime A Abraham
*Assistant Examiner* — Joseph W Iskra
(74) *Attorney, Agent, or Firm* — Oliff PLC

(57) ABSTRACT

A metal joined body has an iron base body and an aluminum base body that are joined together via a joint layer. The joint layer has a first layer composed of a first intermetallic compound formed on the iron base body side and a second layer composed of a second intermetallic compound formed on the aluminum base body side. The first layer has one or more first protrusions that merge integrally into the iron base body and extend in a pile shape into the first intermetallic compound. The second layer may have one or more second protrusions that are composed of a second intermetallic compound and extend in a columnar shape into the aluminum base body. The first intermetallic compound may contain $Al_5Fe_2$, and the second intermetallic compound may (Continued)

contain Al$_3$Fe. The total thickness of the first layer and the second layer is, for example, 2 to 15 μm.

15 Claims, 9 Drawing Sheets

(51) Int. Cl.

| | |
|---|---|
| *B23K 11/11* | (2006.01) |
| *B23K 11/30* | (2006.01) |
| *B23K 101/00* | (2006.01) |
| *B23K 103/20* | (2006.01) |
| *B62D 25/02* | (2006.01) |
| *B62D 25/06* | (2006.01) |

(52) U.S. Cl.
CPC .......... *B23K 11/3018* (2013.01); *B62D 25/02* (2013.01); *B62D 25/06* (2013.01); *B23K 2101/006* (2018.08); *B23K 2103/20* (2018.08)

(58) Field of Classification Search
CPC .... B23K 2103/20; B62D 25/02; B62D 25/06; B62D 29/007

USPC ......................................................... 219/119
See application file for complete search history.

(56) References Cited

U.S. PATENT DOCUMENTS

| | | | |
|---|---|---|---|
| 2011/0123825 A1 | | 5/2011 | Sakurai et al. |
| 2014/0144889 A1 | | 5/2014 | Sakurai et al. |
| 2015/0053655 A1* | | 2/2015 | Sigler .................. B23K 11/115 |
| | | | 219/91.22 |
| 2017/0232547 A1 | | 8/2017 | Chai et al. |

FOREIGN PATENT DOCUMENTS

| | | |
|---|---|---|
| JP | 2013-027890 A | 2/2013 |
| JP | 2013-078804 A | 5/2013 |
| JP | 2019-508253 A | 3/2019 |
| WO | 2018/181231 A1 | 10/2018 |

* cited by examiner

2/9

(Sample 1)

Second nugget

Enlarged site

Al alloy sheet

Second steel sheet

First steel sheet

First nugget

IMC thickness: 4.6μm

Aluminum

Al alloy sheet

AlFe

Second layer

Al₃Fe

First layer

Joint layer

Fe pile

Iron

Second steel sheet

5μm (Sample 2)

Enlarged site

Al alloy sheet

Steel sheet

1mm

Al alloy sheet

Second layer

First layer pile

Steel sheet

FIG. 6

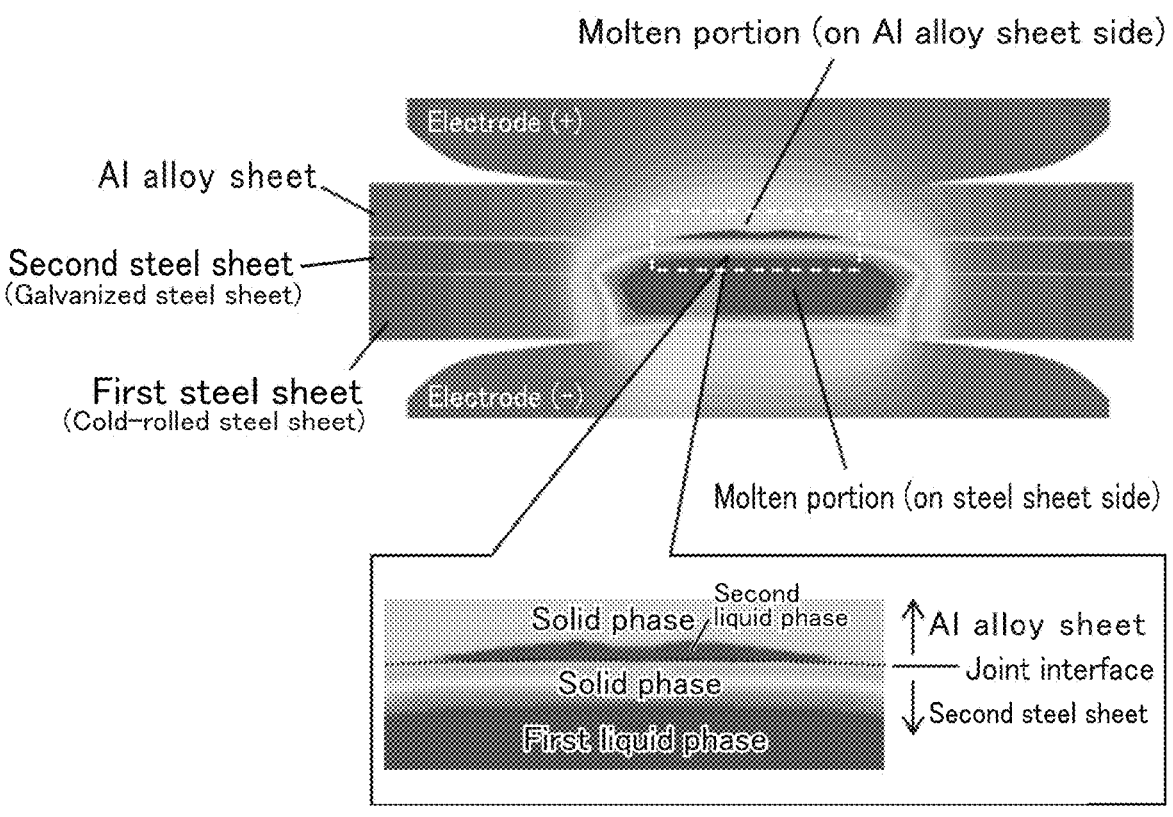

Molten portion (on Al alloy sheet side)

Al alloy sheet

Second steel sheet
(Galvanized steel sheet)

First steel sheet
(Cold-rolled steel sheet)

Molten portion (on steel sheet side)

Second
liquid phase

Solid phase

Solid phase

First liquid phase

↑ Al alloy sheet

— Joint interface

↓ Second steel sheet

FIG. 7

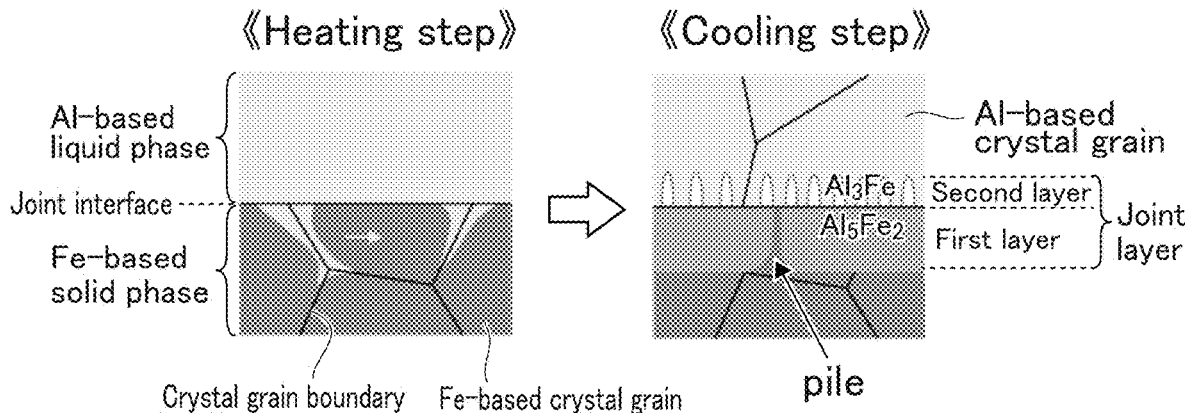

《Heating step》

Al-based
liquid phase

Joint interface

Fe-based
solid phase

Crystal grain boundary     Fe-based crystal grain

《Cooling step》

Al-based
crystal grain

Al₃Fe    Second layer
Al₅Fe₂    First layer

Joint
layer pile

FIG. 8
(a) Tensile shear strength
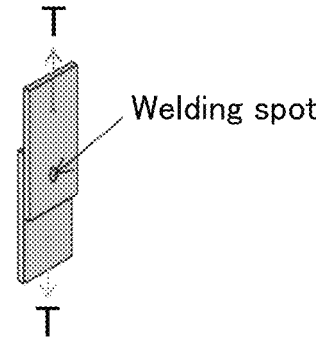
T
Welding spot
T
(b) Cross tensile strength
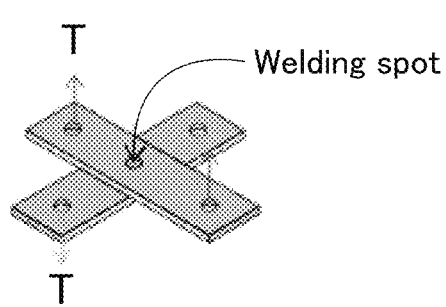
T
Welding spot
T
FIG. 9
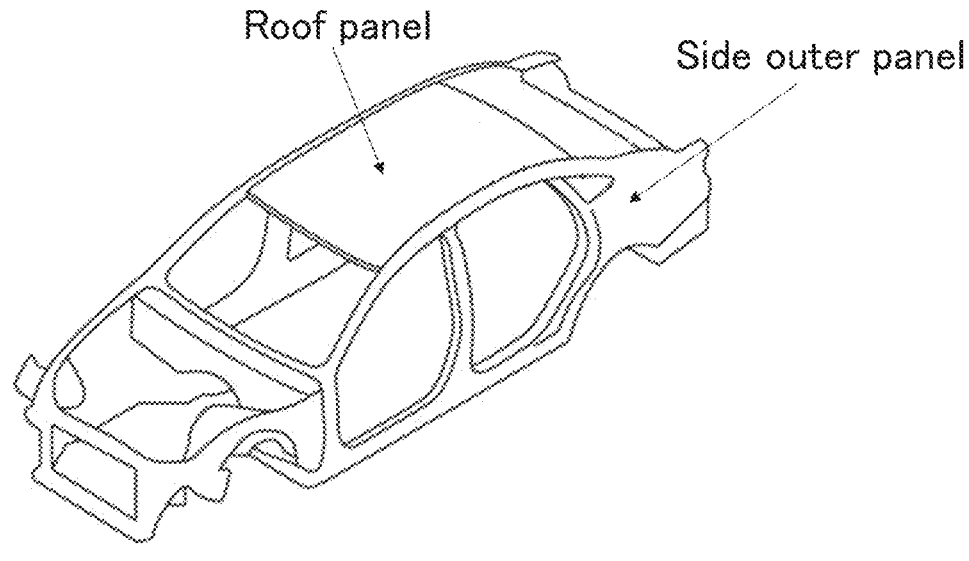
Roof panel
Side outer panel

METAL JOINED BODY AND PRODUCTION METHOD THEREFOR

TECHNICAL FIELD

The present invention relates to a joined body of an iron base body and an aluminum base body and relates also to relevant techniques.

BACKGROUND ART

To reduce the weight and enhance the functionality, members obtained by joining dissimilar metals (referred to as dissimilar metal joined bodies) are used. For example, roofs, outer panels, etc., in which a lightweight aluminum alloy sheet constituting an exterior surface is joined to a steel sheet forming a skeleton or a frame, are being used in automobiles.

Dissimilar metal sheets have been mainly subjected to rivet joining (such as Self-Piercing Rivet joining), clinching (positive-locking), etc. Such a mechanical joining method requires sub-materials (such as rivets) and dedicated equipment and may increase the weight and cost of the joined bodies. In addition, protrusions formed on the mechanically joined sites may cause interference with peripheral members, deterioration of the workability, etc.

It has therefore been proposed that dissimilar metal sheets (in particular, a steel sheet and an aluminum alloy sheet) are joined by spot welding in the same manner as for steel sheets, and relevant descriptions are found, for example, in the following patent documents.

PRIOR ART DOCUMENTS

Patent Documents

[Patent Document 1] JP2006-289452A
[Patent Document 2] JP2013-78804A
[Patent Document 3] JP2013-27890A

SUMMARY OF INVENTION

Technical Problem

Patent Documents 1 to 3 describe joined bodies each obtained by energizing a steel sheet and an aluminum alloy sheet with a constant large current for a short period of time to spot-weld them. The current (density) value is set large because the aluminum alloy sheet itself is directly melted by resistance heating (Joule heating). The energisation time is set short in order to reduce the thickness of a joint layer composed of fragile intermetallic compounds.

In each of the joined bodies, an approximately homogeneous $Al_5Fe_2$ layer was allegedly formed on the steel sheet side near the joint interface with an approximately constant thickness. As a result of investigative research conducted by the present inventors, such a joined body has hardly been put into practical use because the joint quality (such as joint strength or durability) is not stable and the reliability is poor.

The present invention has been made in view of such circumstances, and objects of the present invention include providing a joined body of dissimilar metals suitable for practical use and also providing relevant techniques.

Solution to Problem

As a result of intensive studies to achieve the above objects, the present inventors have successfully obtained a highly reliable metal joined body by forming a joint layer of an iron base body and an aluminum base body so that the joint layer has a structure in which a part of the iron base body protrudes in a pile shape into an intermetallic compound (such a structure will be referred to as a "pile structure"). Developing this achievement, the present inventors have accomplished present invention, which will be described hereinafter.

«Metal Joined Body»

The present invention provides a metal joined body including an iron base body and an aluminum base body that are joined together via a joint layer. The joint layer has a first layer composed of a first intermetallic compound formed on the iron base body side and a second layer composed of a second intermetallic compound formed on the aluminum base body side. The first layer has one or more first protrusions that merge integrally into the iron base body and extend in a pile shape into the first intermetallic compound.

The metal joined body of the present invention has stable joint strength and can be highly reliable and put into practical use. The reason why such an excellent effect can be obtained is considered as follows. The first layer according to the present invention is composed of a composite structure (pile structure) in which the pile-shaped first protrusions (piles) merging into the iron base body extends into the first intermetallic compound. The first intermetallic compound is strongly joined to the iron base body, which is formed into a comb-teeth shape due to the first protrusions, such as by an anchor effect. Moreover, the highly tough or ductile first protrusions composed of the iron base body can sufficiently suppress the progress and propagation of cracks that occur in the first intermetallic compound. It is thus considered that the metal joined body of the present invention can stably maintain a strong joint state at least on the iron base body side.

«Production Method for Metal Joined Body»

The present invention is also perceived as a production method for a metal joined body. For example, the present invention may be perceived as a production method for obtaining the above-described metal joined body. The production method includes a heating step of energizing an iron base body and an aluminum base body to be joined from electrodes to generate a liquid phase of the aluminum base body on a solid phase of the iron base body in a joint portion of the iron base body and the aluminum base body. The electrodes are in pressure contact with outer surfaces of the iron base body and the aluminum base body. The production method further includes a cooling step of cooling the joint portion after the heating step.

According to this production method, the liquid phase of the aluminum base body generated in the joint portion (in the vicinity of the joint interface) in the heating step reacts with the solid phase of the iron base body to generate the above-described first intermetallic compound. At this time, if the time and degree of heating (such as a current value during resistance heating) are adjusted, for example, the unreacted portion of the solid phase of the iron base body remains in a pile shape in the first intermetallic compound to form the first protrusions, and the above-described first layer can thus be formed.

In the cooling step, the liquid phase containing Al and Fe and remaining on the first layer solidifies while reacting with the solid phase of the aluminum base body, and the second layer composed of the above-described second intermetallic compound can be formed. Thus, the joint layer including the first layer and the second layer allows the iron base body and the aluminum base body to be the metal joined body in which they are strongly and stably joined.

«Others»

(1) For descriptive purposes, the term "first" is attached to one located on the iron base body side, and the term "second" is attached to one located on the aluminum base body side.

(2) Unless otherwise stated, a numerical range "x to y" as referred to in the present specification includes the lower limit x and the upper limit y. Any numerical value included in various numerical values or numerical ranges described in the present specification may be selected or extracted as a new lower or upper limit, and any numerical range such as "a to b" can thereby be newly provided using such a new lower or upper limit. Unless otherwise stated, a range "x to y μm" as referred to in the present specification means x μm to y μm. The same applies to other unit systems (such as ms and kA).

BRIEF DESCRIPTION OF DRAWINGS

FIG. 6 is a temperature distribution diagram during a heating step obtained by a simulation using Sample 1 as a model.

FIG. 7 is a schematic diagram illustrating a generation process (mechanism) of a joint layer.

FIG. 8 is a set of schematic diagrams illustrating an evaluation test of joint strength.

FIG. 9 is a schematic diagram illustrating application examples of the metal joined body.

EMBODIMENTS FOR CARRYING OUT THE INVENTION

Figure 1:
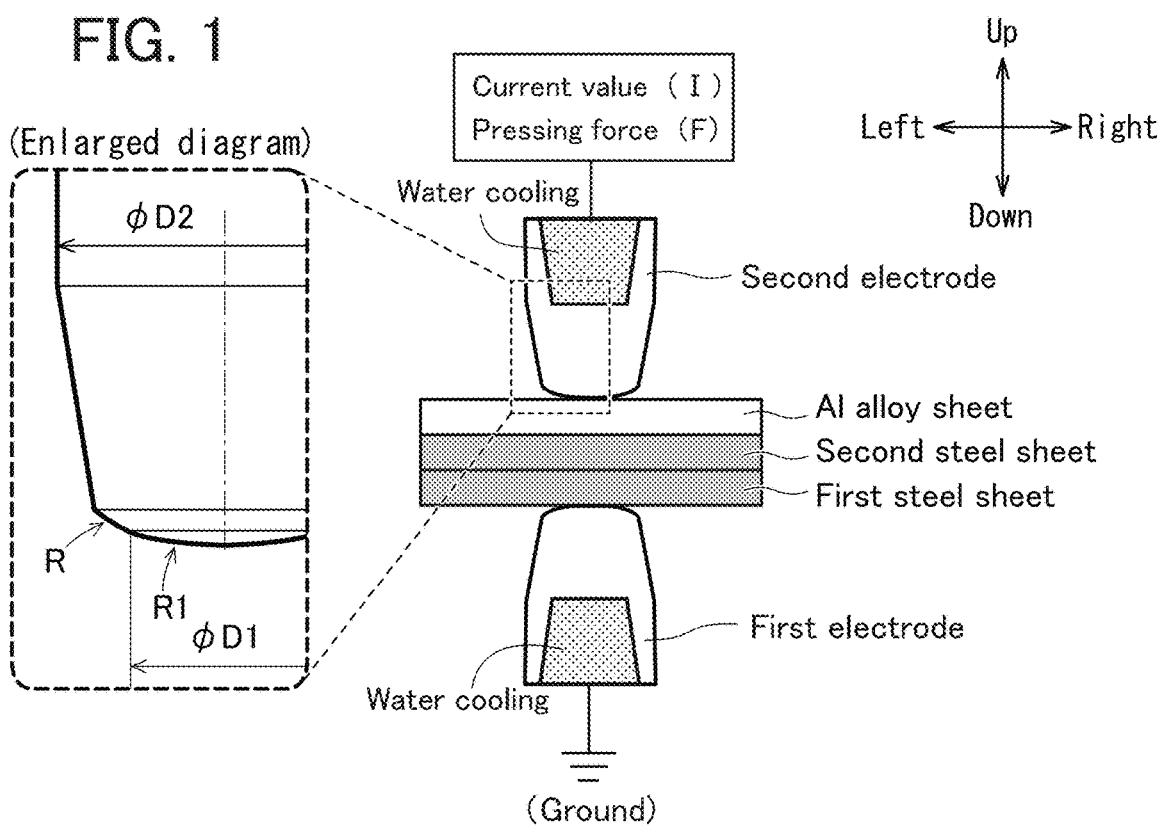
FIG. 1 is a schematic diagram illustrating the overview of spot welding.

One or more features freely selected from the present specification can be added to the above-described features of the present invention. The content described in the present specification can be applied not only to the metal joined body but also to the production method therefor, etc., as appropriate. Which embodiment is the best or not is different in accordance with objectives, required performance, and other factors.

«Iron Base Body and Aluminum Base Body»

The iron base body and the aluminum base body are not limited in their materials (component compositions) or forms. The iron base body may be pure iron or an iron alloy (in particular, a steel material). The aluminum base body may be pure aluminum or an aluminum alloy. The iron base body and the aluminum base body may have the same form or different forms. For descriptive purposes, the following description will be appropriately made with reference to a steel sheet and an aluminum alloy sheet (referred to as an "Al alloy sheet"), which are typical examples of the iron base body and the aluminum base body.

One steel sheet and one Al alloy sheet may be used, or one steel sheet and two or more Al alloy sheets or two or more steel sheets and one Al alloy sheet may be used. Two or more sheet materials may have the same or different sheet thickness, component composition, surface treatment state (such as presence or absence of plating), etc.

The steel sheet is, for example, a cold-rolled steel sheet, a hot-rolled steel sheet, a high-strength steel sheet, a hot-stamped steel sheet, or other similar steel sheet. At least one steel sheet may be surface-treated on one side or both sides. Examples of the surface treatment layer of a steel sheet include a galvanized layer, an Al—Si-based plating layer, a zinc oxide layer, and a Zn—Fe alloy layer. Typical examples of galvanized steel sheets include a hot-dip galvanized steel sheet, an electro galvanized steel sheet, and an alloyed hot-dip galvanized steel sheet. The alloyed hot-dip galvanized steel sheet may be an aluminum-zinc alloy-plated steel sheet (so-called Galvalume steel sheet (registered trademark)).

The surface treatment layer at least on the surface to be joined may be composed of a metal having a melting point lower than that of an Al base material (such as an Al alloy) constituting the aluminum base body. Such a surface treatment layer (plating layer) melts prior to (in priority to) the aluminum base body to wet and spread between the surfaces to be joined, and excess low melting point metal is discharged to the outer periphery of the joined portion. Therefore, even the surface-treated iron base body can be joined to the aluminum base body by a joint layer composed of an almost desired intermetallic compound.

The aluminum base body (Al alloy sheet) is composed, for example, of 2000 series to 8000 series, in particular 5000 series or 6000 series Al alloy. In the case of the 5000 series, for example, Al alloys corresponding to A5052, A5083, A5005, etc. defined by HS are used. In the case of the 6000 series, for example, Al alloys corresponding to A6022, A6016, A6N01, A6061, A6082, etc. defined by JIS are used. Al alloys as referred to in the present specification also include A1000 series.

When the iron base body is a steel sheet, the sheet thickness is, for example, 0.4 to 2.5 mm in an embodiment or 0.6 to 1.8 mm in another embodiment. When the aluminum base body is an Al alloy sheet, the sheet thickness is, for example, 0.8 to 3 mm in an embodiment or 1 to 2 mm in another embodiment. Each sheet thickness may be the same or different.

«Joint Layer»

The joint layer formed between the iron base body and the aluminum base body has at least a first layer composed of a first intermetallic compound formed on the iron base body side and a second layer composed of a second intermetallic compound formed on the aluminum base body side. The first layer and the second layer will be described below.

(1) First Layer

The first layer is located on the iron base body side of the joint layer and has a first intermetallic compound and one or more first protrusions. The first intermetallic compound is mainly composed, for example, of $Al_5Fe_2$. The first protrusions merge integrally into the iron base body and extend in a pile shape into the laminar first intermetallic compound. In other words, the first protrusions extend in a comb-teeth shape from the iron base body, and the first intermetallic compound covers the joint interface of the iron base body while filling the spaces between the first protrusions. The first protrusions are composed of an iron base material as in the iron base body, but their component compositions do not have to be the same. For example, the first protrusions may be composed of an iron alloy that contains more Al or a plating component (e.g., Zn) than the iron base body itself.

The more uniformly a plurality of (a lot of) the first protrusions is distributed in the first intermetallic compound layer, the stronger the first layer is joined to the iron base body, and the propagation and progress of cracks that may occur in the first layer can be suppressed. The number of such first protrusions may be preferably, for example, 2 to 60 in an embodiment, 10 to 55 in another embodiment, 20 to 50 in still another embodiment, or 30 to 45 in yet another embodiment as the number per a reference length (50 μm) along the first layer (referred to as a "protrusion distribution"). If the protrusion distribution is unduly small, the spacing between the first protrusions (piles) will be wide, and the cracks occurring in the first layer may readily progress. If the protrusion distribution is unduly large, the growth of the first layer composed of the first intermetallic, compound (in particular, $Al_5Fe_2$) will be insufficient, and the stability of the joint strength may deteriorate.

The first protrusions may be in a state of penetrating the first intermetallic compound or may also be in a state of being embedded in the first intermetallic compound. In any case, the thickness of the first layer and the thickness of the first protrusions ("width" in the cross section) may be preferably within respective desired ranges. For example, the ratio of the thickness (t1) of the first layer to the width (w) of the first protrusions (referred to as a "thickness-to-width ratio") may be preferably 1 to 20 in an embodiment, 2 to 10 in another embodiment, or 3 to 5 in still another embodiment. If the thickness-to-width ratio (t1/w) is unruly small, the growth of the first layer composed of the first intermetallic compound (in particular, $Al_5Fe_2$) will be insufficient, and the joint strength may deteriorate. If the thickness-to-width ratio is unduly large, the first protrusions (piles) will be thin, and the cracks occurring in the first layer may readily progress.

In order to ensure stable joint properties, the thickness of the first layer is, for example, 1 to 10 μm in an embodiment, 2 to 7 μm in another embodiment, or 3 to 5 μm in still another embodiment. The total thickness of the first layer and the second layer is, for example, 2 to 15 μm in an embodiment, 3 to 10 μm in another embodiment, or 4 to 8 μm in still another embodiment.

Unless otherwise stated, the protrusion distribution, the width-thickness ratio, the thickness of each layer, the form of protrusions, etc. as referred to in the present specification are determined based on an image (SEM image) obtained by observing a cross section of the joined portion (in particular, an outer peripheral region excluding the central region of a nugget (e.g., within 40% of the nugget diameter)) with a microscope. Details will be described later (see FIGS. 3C to 3E).

(2) Second Layer

The second layer is located on the aluminum base body side of the joint layer and composed of a second intermetallic compound. The second intermetallic compound is mainly composed, for example, of $Al_3Fe$. The second layer may be in a laminar shape having an approximately constant thickness or may also be in a comb-teeth shape. The second layer in a comb-teeth shape has one or more second protrusions that extend in a columnar shape to the aluminum base body side, for example, in addition to a base layer composed of the second intermetallic compound. The second protrusions enhance the anchor effect and strongly join the second layer to the aluminum base body. Moreover, the aluminum base body existing between a plurality of (a lot of) the second protrusions can suppress the propagation and progress of cracks that may occur in the second layer fin particular, the second intermetallic compound layer).

«Production Method»

The metal joined body is obtained, for example, through a heating step of generating a liquid phase of the aluminum base body on a solid phase of the iron base body and a cooling step of cooling the joint portion after the heating step. The heating step and the cooling step will be described below. For descriptive purposes, the description will be appropriately made by exemplifying a case in which a steel sheet and an Al alloy sheet are spot-joined (welded).

(1) Heating Step

The heating step is performed, for example, by energizing the iron base body and the aluminum base body to be joined from electrodes in pressure contact with outer surfaces of the iron base body and the aluminum base body. This energization may be preferably performed to such an extent that the aluminum base body itself does not directly melt only by resistance heating. That is, the energization may be preferably performed to such an extent that the aluminum base body forms a liquid phase in the vicinity of the joint interface together with the heat transfer from the resistance-heated iron base body.

The heating step causes a melting reaction (solid-liquid interdiffusion layer reaction) between the liquid phase of the aluminum base body and the solid phase of the iron base body. Thus, the first layer interdiffusion layer) composed mainly of the first intermetallic compound (e.g., $Al_5Fe_2$) is generated on the iron base body side of the joint portion.

The value of current flowing through the joint portion is, for example, 10 to 15 kA (or less than 15 kA) in an embodiment, 11 to 14.5 kA in another embodiment, 11.5 to 14 kA in still another embodiment, or 12 to 13 kA in yet another embodiment. As the current density calculated by dividing the current value by the tip area (second tip area) of the electrode (second electrode) on the Al alloy sheet side, for example, it may be 50 to 300 $A/mm^2$ in an embodiment or 100 to 250 $A/mm^2$ in another embodiment.

The energization time is, for example, 200 to 500 ms in an embodiment, 250 to 450 ms in another embodiment, or 300 to 400 ms in still another embodiment. The current value may be changed with respect to the energization time. For example, upslope energization may be performed, in which the current value is monotonically increased (differential coefficient≥0). This can efficiently generate the liquid phase of the aluminum base body in the vicinity of the joint interface while suppressing spatter and dust.

When the current value is changed, the upper limit and the lower limit may be preferably within the above range. As the current value as an index, for example, the average value obtained by dividing the integrated value of the current value (absolute value) with respect to the energization time by the energization time can be used. In this case, the average value may be preferably within the above range.

Before the above energization (heating step), a pre-energization step may be performed to settle the contact state between the iron base body and the aluminum base body. The pre-energization step may be preferably performed by energization to such an extent that a liquid phase is not generated in the vicinity of the joint interface. For example, the pre-energization step may be performed by energization with a current value (e.g., 3 to less than 10 kA in an embodiment or 5 to 9.5 kA in another embodiment) smaller than that in the heating step. After the pre-energization process (before the main energization in the heating step), it may be preferred to cut off (non-energization) or reduce the energization of the electrodes and lower the temperature in the vicinity of the joint interface to reduce the electric resistance value. The period is, for example, 10 to 200 ms in an embodiment or 50 to 150 ms in another embodiment.

(2) Cooling Step

The cooling step is to cool the joint portion after the heating step through the electrodes, such as by cutting off the energization (non-energization) after the heating step or performing energization with a small current value (which may be a constant value, a monotonically decreasing value, or the like). The cooling step allows the residual liquid phase containing at least Fe and Al to solidify or further melt-react with the aluminum base body after the generation of the first layer or in parallel with the generation. Thus, the second layer mainly composed of the second intermetallic compound (e.g., $Al_3Fe$) can be generated on the aluminum base body side of the joint portion.

《Electrodes》

The iron base body and the aluminum base body are usually energized through electrodes that are in pressure contact with them. It may be preferred to use electrodes suitable for the characteristics (such as a shape, a size, and a material) of the iron base body and the aluminum base body. As an example, electrodes used for spot-joining (welding) a steel sheet and an Al alloy sheet will be described.

(1) Form

The electrodes for spot welding may each be an electrode that can be detachably attached to a shank (a cap tip-type electrode) or may also be an electrode that is integrated with a shank (an integrated-type electrode). The cap tip-type electrode (also referred to as a "tip") is usually used in order to reduce the cost.

The electrode (tip) has, for example, a tip portion that is formed in a bottomed and approximately cylindrical shape and a body portion that is formed in an approximately cylindrical shape and merges into the tip portion. The outer surface (pressure contact surface) of the tip portion may be a convex surface or a recessed concave surface. The size of the electrode is not limited. The outer diameter (nominal diameter/D2) of the body portion is, for example, φ10 to 20 mm in an embodiment or φ12 to 18 mm in another embodiment. The tip diameter (D1) is, for example, φ6 to 14 mm in an embodiment or φ8 to 12 mm in another embodiment.

The electrode may be preferably configured such that a cooling medium (cooling liquid/cooling water) is introduced into an inner cylindrical part provided inside the tip portion. When the cooling medium is forcibly circulated, suppression of temperature rise of the electrode and cooling of the sheet materials through the electrode are stably achieved.

Basic shapes of the tip portions of electrodes (in particular, convex electrodes) are defined in HS C9304 (1999). Examples of the basic shapes include a flat shape (F-type), a radius shape (R-type), a dome shape (D-type), a dome radius shape (DR-type), a cone frustum shape (CF-type), and a cone frustum radius shape (CR-type). For spot welding of a steel sheet and an Al alloy sheet, for example, DR-type or R-type electrodes may be used from the viewpoint of versatility.

(2) Material

The electrodes (at least the tip portions) may be preferably composed of a material excellent in the thermal conductivity, electrical conductivity, strength, etc. For example, the electrodes to be used are composed of a copper alloy having an electrical conductivity of 75% to 95% FACS in an embodiment or 80% to 90% IACS in another embodiment. The copper alloy is, for example, chromium copper, zirconium copper, chromium-zirconium copper, alumina-dispersed copper, beryllium copper, or the like.

The electrode in contact with the steel sheet and the electrode in contact with the Al alloy sheet may have the same form (shape, size (diameter)) and material or different forms and materials.

(3) Pressing Force

The pressing force for bringing an electrode into pressure contact with the steel sheet or the Al alloy sheet is, for example, 2 to 6 kN in an embodiment or 3 to 5 kN in another embodiment. If the pressing force is unduly small, dust and spatter will readily occur. If the pressing force is unduly large, deep dents (depressions) will readily occur by the electrodes, and deformation and wear of the electrodes are likely to occur. The contact area between the sheet material and an electrode (the area of the tip of the electrode) required for calculating the current density can be replaced by the projected area of the indentation formed on the sheet material after being joined.

《Others》

(1) The current value (current density) for energization may be constant, but may also be changed along a desired pattern. For example, at the start of energization stage of energization), an ascending process (upslope process) of moderately increasing the amount of energization can be provided thereby to suppress the occurrence of dust or the like due to a sudden increase in the current value. Additionally or alternatively, at the end of energization (final stage of energization), a descending process (downslope process) of moderately reducing the amount of energization can be provided thereby to suppress weld cracking (such as solidification cracking caused by solidification shrinkage of a molten pool or hot cracking that can occur around the recrystallization temperature) due to a sudden drop in the current value.

It suffices that the pressing force for the electrodes is within a range in which it can maintain the contact state required for energization and cooling and does not cause excessive sheet thickness reduction or the like. The pressing force may change during the steps, but it usually suffices that the pressure force is approximately constant throughout the steps.

(2) The iron base body and the aluminum base body may be subjected to heat treatment such as annealing or tempering after being joined. Through the heat treatment, adjustment of the structure, removal of the residual stress, and the like are achieved in the joined portion (nugget) or its vicinity (heat-affected portion). The heating temperature is, for example, 120° C. to 250° C. in an embodiment or 150° C. to 200° C. in another embodiment. The heating time is, for example, 10 to 180 minutes in an embodiment or 30 to 120 minutes in another embodiment. The heating range may be the entire joined body or a part (such as the joined portion).

«Applications»

The metal joined body of the present invention is used for various members and structures. For example, when a panel for a vehicle or the like is constructed of the metal joined body of the present invention, the weight of the vehicle can be reduced and other advantages can be obtained. The panel for a vehicle is, for example, formed by joining an Al alloy sheet constituting the exterior surface to a skeleton (such as platform) composed of a steel sheet. Panels for a vehicle that are the upper structures of the vehicle include, for example, roof panels, side outer panels, and the like (see FIG. 9).

EXAMPLES

Metal joined bodies each formed through stacking steel sheets and an Al alloy sheet to obtain a set of sheets and spot-welding the set of sheets were prepared, and the joint structure and joint strength were evaluated. The present invention will be described in more detail while exemplifying such specific examples.

First Example

The overview of spot welding according to the present example is illustrated in FIG. 1. FIG. 1 exemplifies, as materials to be welded, a set of sheets in which a first steel sheet, a second steel sheet, and an Al alloy sheet are stacked in this order. Spot welding is performed by energizing the set of sheets from a pair of electrodes that are in pressure contact with the surfaces of the set of sheets (the lower surface of the first steel sheet and the upper surface of the Al alloy sheet). In the present example, for descriptive purposes, the directions of arrows illustrated in FIG. 1 are referred to as the up-down direction and the right-left direction unless otherwise stated.

«Preparation of Sample»

(1) Sheet Materials

A non-plated cold-rolled steel sheet (440 MPa class/sheet thickness: 1.4 mm) was used as the first steel sheet while an alloyed hot-dip galvanized steel sheet (270 MPa class/sheet thickness: 0.8 mm) was used as the second steel sheet, with an Al alloy sheet (wrought material equivalent to JIS A6022/ sheet thickness: 1.2 mm). The galvanized steel sheet is formed with galvanized layers (metal layers) having a thickness of about 8 $\mu$m. The melting point of the galvanized layer itself is about 420° C., and the melting point of the Al alloy sheet is about 650° C.

Each sheet material was subjected to the spot welding without any modification such as surface polishing. Each sheet material was cut into a strip shape (30 mm×100 mm) and used.

(2) Electrodes

The same DR-type (JIS C9304) commercially available tips (available from OBARA Corporation) were used for the first electrode on the first steel sheet side and the second electrode on the Al alloy sheet side. Forcibly circulated cooling water (flow rate: 2.7 L/min) was supplied into the inside (inner cylindrical parts) of the tips to forcibly cool the tips. The electrodes are made of chromium copper (Cr: 1 mass %, Cu: the balance) and the electrical conductivity is 80% IACS.

As illustrated in the enlarged diagram of FIG. 1, the sizes of the electrodes were set to a tip diameter (nominal diameter D2): $\varphi$16 mm, a tip bottom portion thickness of 12 mm, a tip shoulder portion radius of curvature (R): 8 mm, a tip surface radius of curvature (R1): 40 mm, and a tip diameter (D1) of 12 mm.

(3) Welding Conditions

Figure 2:
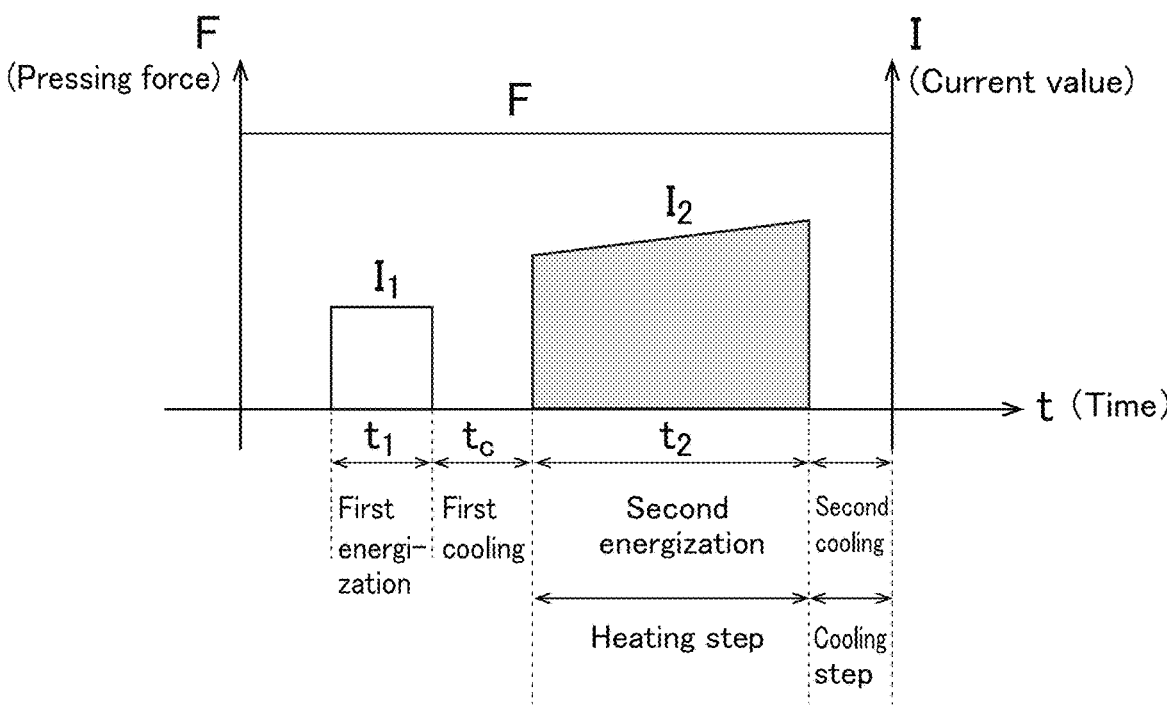
FIG. 2 is a time chart example related to the spot welding.

Spot welding was performed using a servo pressure-type spot welder (PA235KVAMF available from ARO). An example of the energization pattern is illustrated in FIG. 2. In this case, the pressing force (F) for the set of sheets by the electrodes was set constant at 4 kN. The energization was performed as follows by controlling the DC current.

A first energization step (pre-energization step) was performed with a first current value ($I_1$): 8 kA and an energization time: 100 ms. After this energization, the set of sheets was cooled through both electrodes in a non-energized state for 100 ms (first cooling step). Through this operation, the electric resistance value between the sheet materials (in particular, between the second steel sheet and the Al alloy sheet) was reduced to a predetermined range so that the subsequent second energization step could be performed stably.

After the first cooling step, a second energization step (heating step/main energization step) was performed with a second current value ($I_2$): 10 to 14 kA (current density: 88 to 123.8 A/mm$^2$) and an energization time: 400 ms. The second energization step was performed by upslope energization in which the current value was increased linearly and monotonically from an initial value ($I_{2i}$): 10 kA to a final value ($I_{2f}$): 14 kA. Through this operation, the amount of energization was ensured while suppressing the occurrence of dust, etc., and the joint layer and nugget were grown. The metal joined body thus obtained is referred to as "Sample 1."

«Observation»

Figure 3A:
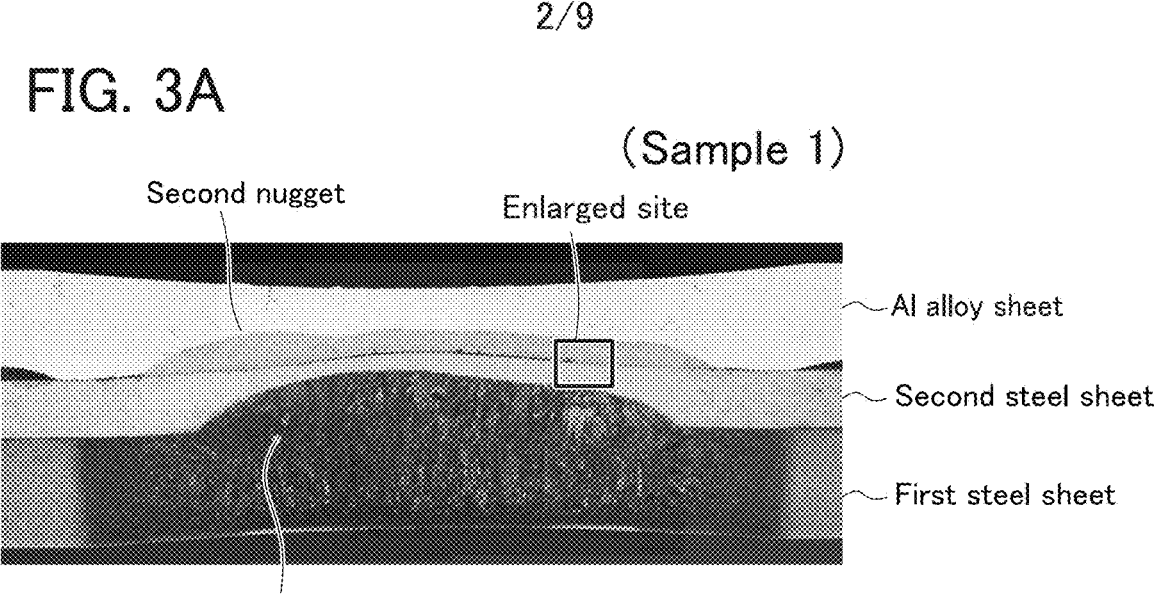
FIG. 3A is a microscope photograph showing a cross section of a joined portion in Sample 1.

(1) FIG. 3A shows a photograph obtained by observing the cross section of a joined portion of Sample 1 using an inverted metallographic microscope (GX53 available from Olympus Corporation). As apparent from FIG. 3A, it has been confirmed that the first steel sheet and the second steel sheet are joined via a first nugget located between their facing surfaces, and the second steel sheet and the Al alloy sheet are joined via a second nugget located between their facing surfaces.

From FIG. 3A, it has been found that both the first steel sheet and the second steel sheet are melted and then solidified to form the first nugget. It has also been found that the melted Al alloy sheet reacts with the second steel sheet (solid-liquid interdiffusion/melting reaction) to form the second nugget. As found from FIG. 3A, both the first nugget and the second nugget had sufficient sizes (diameters) and thicknesses (lengths in the sheet thickness direction). The indentation (dimple, depression) on the Al alloy sheet side due to the electrode remained at a depth of about 0.3 mm (sheet thickness reduction: about 25%).

Figure 3B:
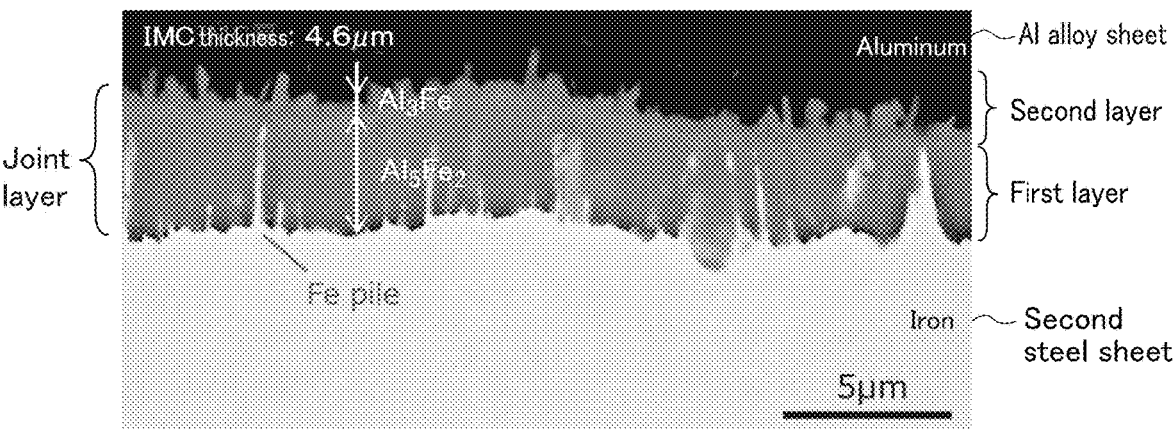
FIG. 3B is a microscope photograph showing a cross section of a joint layer between an Al alloy sheet and a steel sheet in Sample 1.

(2) FIG. 3B shows a photograph (SEM image) obtained by observing the structure near the joint interface between the second steel sheet and the Al alloy sheet using a scanning electron microscope (S-3600N available from Hitachi High-Tech Corporation). When the structure was observed with an energy dispersive X-ray spectroscope (EDX) attached to the microscope, an $Al_5Fe_2$ phase and an $Al_3Fe$ phase as well as an Fe—Al—Zn phase (solid solution of Zn mainly in $Al_5Fe_2$) or/and an Al—Zn phase were observed as the intermetallic compounds.

It has been confirmed, however, that the joint layer between the second steel sheet and the Al alloy sheet is mainly composed of the first layer including the $Al_5Fe_2$ phase (first intermetallic compound) on the second steel sheet side and the second layer including the $Al_3Fe$ phase (second intermetallic compound) on the Al alloy sheet side.

As apparent from FIG. 3B, in the first layer, elongated pile-shaped first protrusions (referred to as "piles," as appropriate) extending integrally from the second steel sheet were approximately uniformly distributed in the $Al_5Fe_2$ phase. On the other hand, in the second layer, relatively thick columnar second protrusions were approximately uniformly distributed, extending integrally from the $Al_3Fe$ phase formed on the first layer ($Al_5Fe_2$ phase) and growing so as to bite into the Al alloy sheet.

(3) In general, the intermetallic compound layer (interfacial reaction layer) is brittle, so it is said that its thickness is preferably 1 to 2 μm or less. In the case of the present example, however, the thickness of the joint layer composed of the intermetallic compound was about 4.6 μm (the thickness of the first layer ($Al_5Fe_2$ phase): about 3.5 μm, the thickness of the second layer ($Al_3Fe$ phase): about 1.1 μm).

The distribution of piles (protrusion distribution) was 41.6 piles per a length of 50 μm (reference length: L) along the plane direction of the first layer, which was sufficient. The ratio of the thickness (t1) of the first layer to the width (w) of the piles (thickness-to-width ratio: t1/w) was 3.1, which was within a desired range.

Figure 3C:
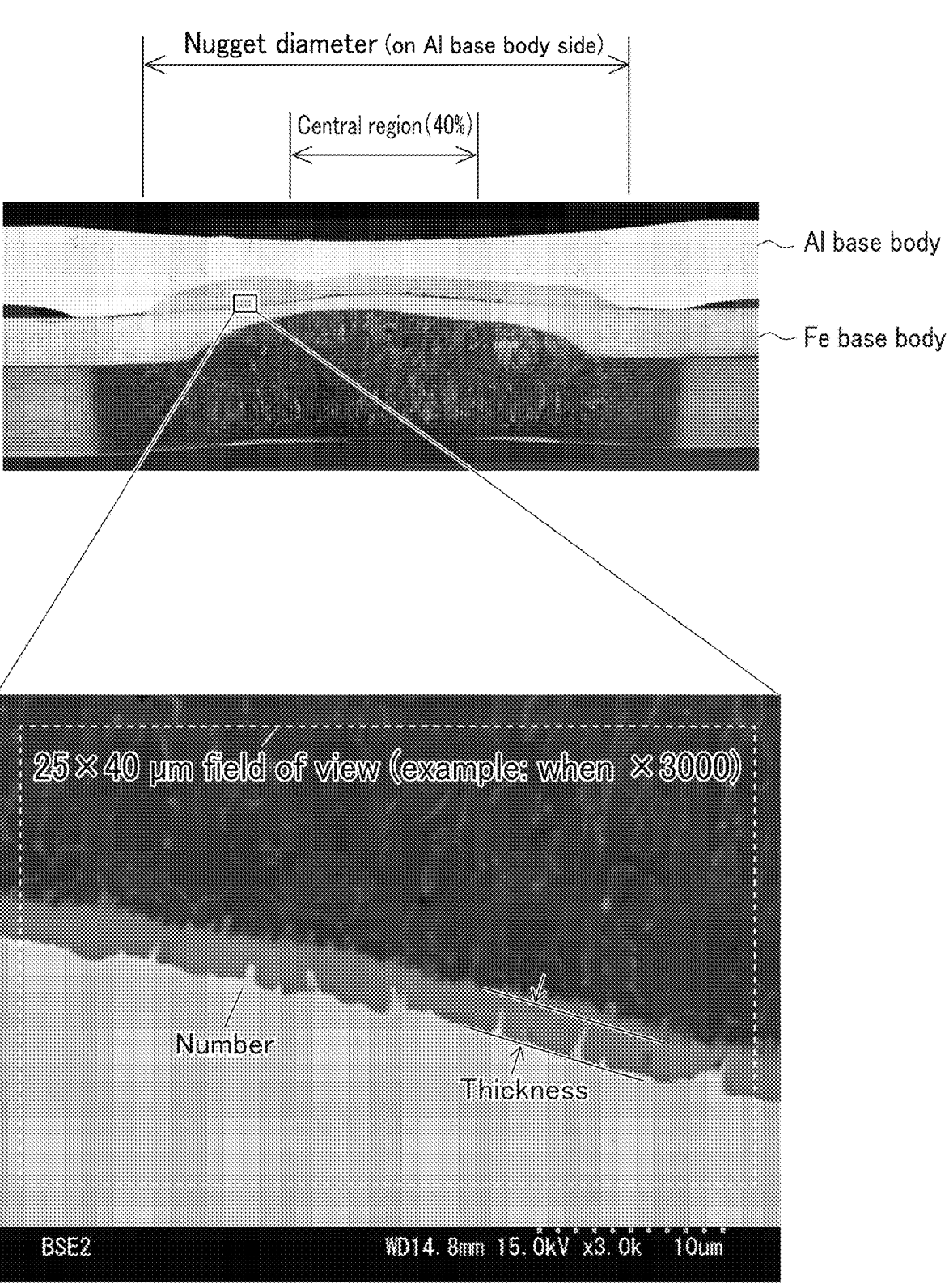
FIG. 3C is a microscope photograph showing an example of a region for specifying parameters with reference to Sample 1.
Figure 3D:
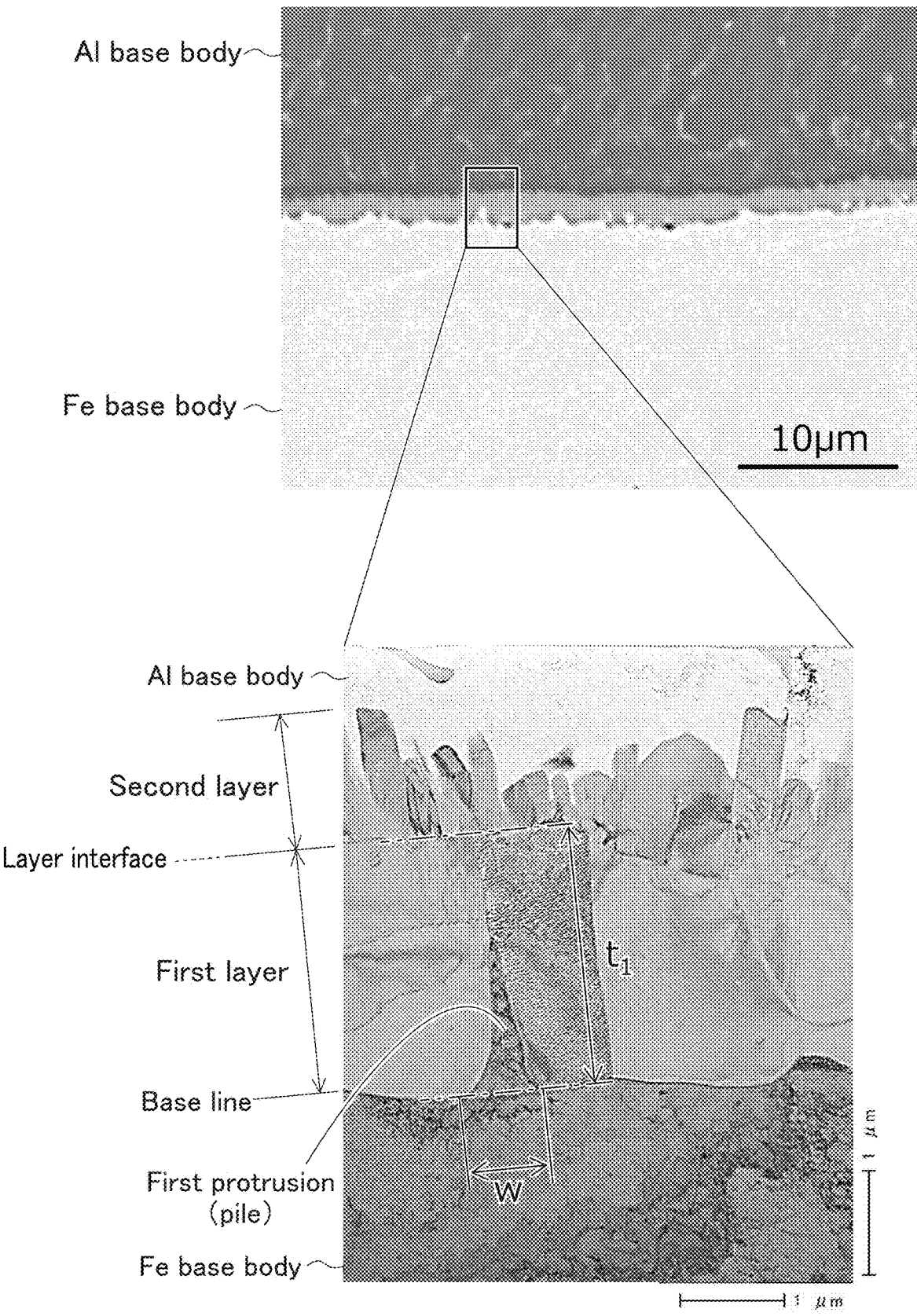
FIG. 3D is a microscope photograph exemplifying a thickness (t1) of a first layer and a width (w) of a first protrusion with reference to Sample 1.
Figure 3E:
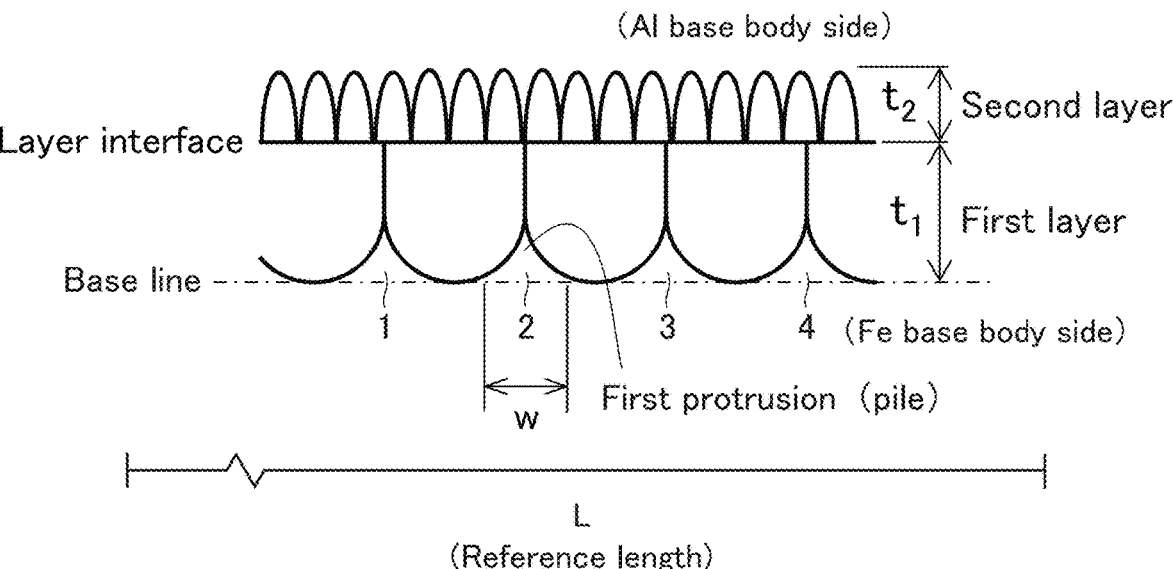
FIG. 3E is a reference diagram schematically illustrating an example of the form of a joint layer.

The above-described thickness of each layer, protrusion distribution, and thickness-to-width ratio were specified as follows. First, as shown in FIGS. 3C and 3D, the vicinity of the joint layer in the outer peripheral region of the joined portion (nugget) between the iron base body and the aluminum base body is observed in an enlarged view. Then, the thickness of the layer, the width of the piles, and the number of the piles are specified within the field of view of a predetermined size (e.g., 25 μm×40 μm) cut out from the observation image (SEM image). Specific description is as follows (see FIG. 3E).

The thickness of the layer is the shortest distance between the boundary between the iron base body and the first layer (referred to as a "base line") and the boundary between the first layer and the second layer (referred to as a "layer interface"). The "layer thickness" determined for each field of view is the maximum value of the shortest distance measured continuously or discretely (e.g., at 0.5 μm intervals) along the basal line.

The width of the piles is a root length (distance between contacts) of the piles in contact with the base line. The "width of piles" determined for each field of view is an arithmetic average value of the root lengths of respective piles measured along the base line. The "number of piles" determined for each field of view is the total number counted in the same field of view.

For each of 10 fields of view that are appropriately selected from the outer peripheral region of the joined portion, the thickness of the layer, the width of the piles, and the number of the piles described above are obtained. Respective arithmetic average values for the 10 fields of view are adopted as the layer thickness (t1, t2), the width of piles (w), and the number of piles (N) as referred to in the present specification. The protrusion distribution and thickness-to-width ratio as referred to in the present specification are calculated based on them. When the width of the observation field of view is x μm ($\neq$50 μm), a converted value obtained by multiplying the number of piles (N) by a coefficient (50/x) is determined, and the average value for the 10 fields of view is adopted as the protrusion distribution.

«Evaluation»

Spot welding was performed under the above-described conditions, and two types of test pieces illustrated in FIGS. 8(a) and 8(b) were prepared. When the tensile test was performed using each test piece, the tensile shear strength (average value of 5 times) was 4780 N, and the cross tensile strength (average value of 5 times) was 1080 N. It has been confirmed that sufficient joint strength can be obtained even when a thick joint layer is formed as described above. Each joint strength is the load at the time of fracture.

Second Example

The materials to be welded composed of the set of total three sheets used in First Example were replaced with a set of total two sheets in which one steel sheet (first steel sheet) and one Al alloy sheet were stacked in this order, and spot welding was performed. For the steel sheet and the Al alloy sheet, a cold-rolled steel sheet (440 MPa class/sheet thickness: 1.0 mm) and an aluminum extruded material (6N01/ sheet thickness: 3.0 mm) were used, respectively.

«Preparation of Sample»

Using the spot welding apparatus illustrated in FIG. 1, Sample 2 and Sample C were prepared under the following welding conditions. In each case, DC current energization was performed, and the pressing force (F) was set to 4 kN (constant).

Sample 2 was prepared as in the case of Sample 1 with the first current value ($I_1$): 8 kA, the first energization time: 100 ms, the first cooling time: 100 ms, the second current value ($I_2$): 10 to 14 kA (current density: 88 to 123.8 $A/mm^2$), and the second energization time: 400 ms. As in First Example, the second energization step was performed by the upslope energization from an initial current value ($I_{2i}$): 10 kA to a final current value ($I_{2f}$): 14 kA along the chart illustrated in FIG. 2.

Sample C was prepared with the first current value ($I_1$): 8 kA, the first energization time: 100 ms, the first cooling time: 100 ms, the second current value ($I_2$): 13 kA (current density: 115 $A/mm^2$), and the second energization time: 500 ms. In the second energization step, the second current value was kept constant to perform the energization.

«Observation»

Figure 4A:
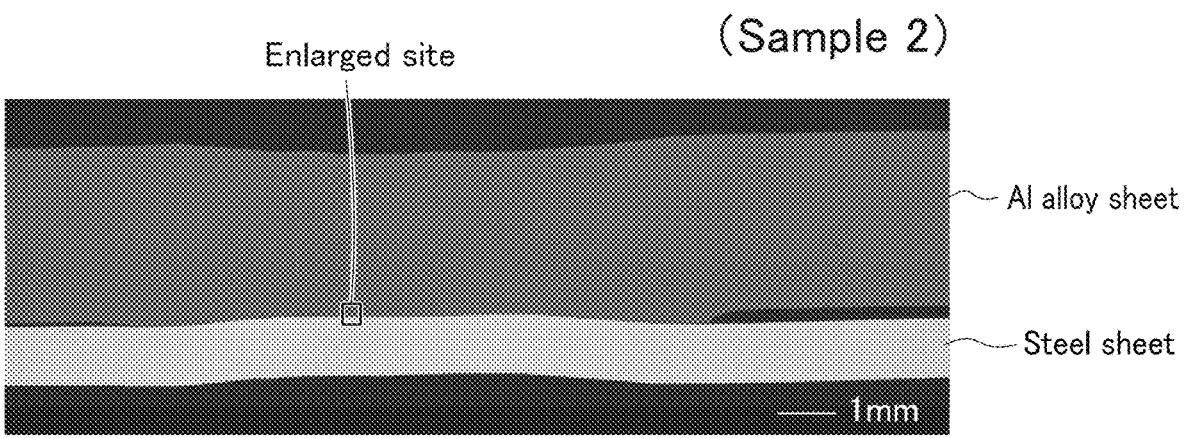
FIG. 4A is a microscope photograph showing a cross section of a joined portion in Sample 2.
Figure 4B:
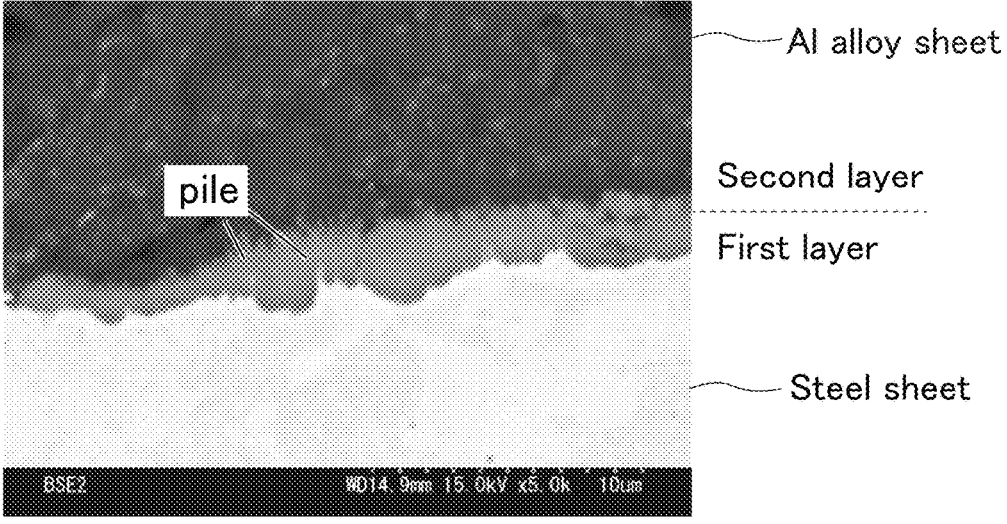
FIG. 4B is a microscope photograph showing a cross section of the joint layer between an Al alloy sheet and a steel sheet in Sample 2.

The cross section of the joined portion of each sample was observed with the previously described inverted metallographic microscope. In addition, for each sample, the structure near the joint interface between the steel sheet and the Al alloy sheet was observed in an enlarged view with the previously described scanning electron microscope. As an example, observation images relating to Sample 2 are shown in FIGS. 4A and 4B (these figures are collectively referred to as "FIG. 4").

As apparent from FIG. 4, even in the metal joined body composed of the set of two sheets of the steel sheet and the Al alloy sheet, a joint layer similar to that of the metal joined body according to First Example was confirmed. That is, when observed with the EDX as in First Example, the first layer mainly composed of the $Al_5Fe_2$ phase (first intermetallic compound) was confirmed on the steel sheet side while the second layer mainly composed of the $Al_3Fe$ phase (second intermetallic compound) was confirmed on the Al alloy sheet side.

In the first layer, the pile-shaped first protrusions (piles) extending integrally from the steel sheet were distributed approximately uniformly in the $Al_5Fe_2$ phase. In the second layer, the columnar second protrusions extending integrally from the $Al_3Fe$ phase formed on the first layer and growing into the Al alloy sheet were distributed approximately uniformly.

Figure 5:
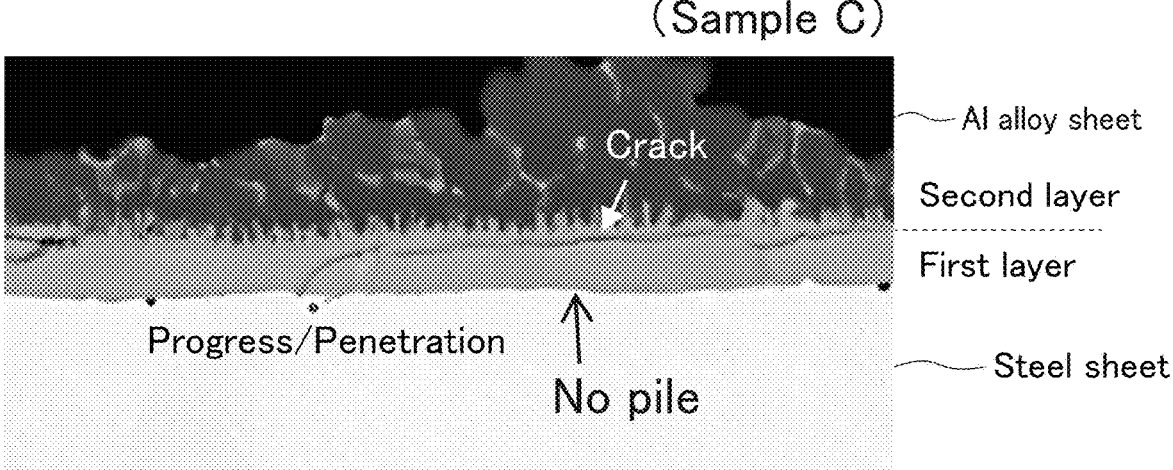
FIG. 5 is a set of microscope photographs each showing a cross section of a crack formed in the joint layer between an Al alloy sheet and a steel sheet in Sample 2 and Sample C.

On the other hand, no first protrusions (piles) were observed in the first layer of Sample C (see FIG. 5). It is considered that the piles disappeared by the energization for a long time and the entire first layer became the $Al_5Fe_2$ phase. In the second layer of Sample C, a large number of fine protrusions extending integrally from the $Al_3Fe$ phase and growing into the Al alloy sheet were observed.

«Evaluation»

(1) The tensile test illustrated in FIG. 8 was also performed on Sample 2 and Sample C. In the case of Sample 2, the tensile shear strength was 4870 N. In the case of Sample C, the tensile shear strength was 4230 N and the cross tensile strength was 500 N. The joint strength of Sample 2 was sufficiently high, but the joint strength of Sample C was smaller than that of Sample 2.

(2) For Sample 1 and Sample C, the vicinity of the outer periphery of the joined portion of the broken cross tensile test piece (FIG. 8 (*b*)) was observed with the previously described scanning electron microscope. Both observation images are shown together in FIG. 5. As apparent from FIG. 5, in Sample 1, cracks occurring in the joint layer at the time of breakage detoured and progressed around the piles, and the progress of the cracks was suppressed by the piles. It is considered that Sample 1 exhibited high joint strength due to such a breakage process. Such a breakage process was the same for Sample 2.

On the other hand, in Sample C, cracks occurring at the time of breakage propagated through the first layer and progressed a long distance to reach the steel sheet because of no piles in the first layer. It is thus considered that the joint strength of Sample C was low.

<Discussion>

The mechanism of formation of the joint layer according to the present invention is discussed.

(1) Temperature Distribution

The temperature distribution of the joint portion at the time of spot welding of Sample 1 (First Example) is numerically analyzed using the resistance welding simulation software SORPAS. The analysis model used at this time and an example of the analysis result (temperature distribution during the second energisation) are collectively illustrated in FIG. 6.

As apparent from FIG. 6, it is found that the second energization allows the first steel sheet and the second steel sheet to melt to generate the first liquid phase at the joint interface between the first steel sheet and the second steel sheet. The first liquid phase is solidified by the second cooling after the second energization and becomes a first nugget that joins the first steel sheet and the second steel sheet.

It is also found that the second energization allows the Al alloy sheet to melt to generate the second liquid phase at the joint interface between the second steel sheet and the Al alloy sheet. Here, under the welding conditions (second current value) described in First Example, the Al alloy sheet is not directly melted only by the resistance heating (Joule heating). It is therefore considered that the Al alloy sheet is melted by its own resistance heating and the conductive heat from the second steel sheet side. The second liquid phase is solidified by the second cooling after the second energization and becomes a second nugget (joined portion) that joins the Al alloy sheet and the second steel sheet.

(2) Generation of Joint Layer

On the basis of the above-described simulation results, it is considered that the joint layer (which is composed of the first layer and the second layer) between the Al alloy sheet and the steel sheet is generated as follows.

First, in the heating step by the second energization, the liquid phase (second liquid phase) of the Al alloy formed by melting the Al alloy sheet comes into contact with the surface of the steel sheet (solid phase) to generate a melting reaction (solid-liquid interdiffusion reaction: SLID). Specifically, the liquid phase of the Al alloy permeates and diffuses from the crystal grain boundaries of the steel sheet to form the first layer composed of the first intermetallic compound on the steel sheet side. At this time, by adjusting the transition timing from the heating step to the cooling step (the final stage of the second energization/the initial stage of the second cooling), some of the Fe-based crystal grains of the steel sheet remain in an unreacted state and become the piles (first protrusions) integrated with the steel sheet.

Then, in the cooling step after the second energization, the liquid phase containing Fe and Al remaining on the steel sheet solidifies. This allows the second layer composed of the second intermetallic compound to be formed on the Al alloy sheet side. At this time, the liquid phase solidifies while reacting with the Al alloy sheet, and therefore the columnar second protrusions composed of the second intermetallic compound are formed so as to bite into the Al alloy sheet.

It is thus considered that the joint layer composed of the first layer and the second layer is formed in the vicinity of the joint interface between the Al alloy sheet and the steel sheet. The dissimilar metal joined body having such a joint layer exhibits stable joint strength and is excellent in the reliability.

The invention claimed is:

1. A metal joined body comprising an iron base body and an aluminum base body that are joined together via a joint layer, the joint layer having a first layer composed of a first intermetallic compound formed on the iron base body side and a second layer composed of a second intermetallic compound formed on the aluminum base body side, the first layer having a plurality of elongated pile-shaped first protrusions that merge integrally into the iron base body and extend from the iron base body into the first intermetallic compound, the plurality of elongated pile-shaped first protrusions being approximately uniformly distributed in the first intermetallic compound and forming an interface between the iron base body and the first layer of the joint layer, wherein the first protrusions comprise 10 to 55 protrusions per a reference length (50 μm) of the first layer, and at least some of the plurality of elongated pile-shaped first protrusions extend at least halfway into a thickness of the first layer of the joint layer.

2. The metal joined body according to claim 1, wherein the second layer has one or more second protrusions that are composed of the second intermetallic compound and extend in a columnar shape into the aluminum base body.

3. The metal joined body according to claim 1, wherein the first intermetallic compound contains $Al_5Fe_2$, and the second intermetallic compound contains $Al_3Fe$.

4. The metal joined body according to claim 1, wherein the first layer has a thickness of 1 to 10 μm.

5. The metal joined body according to claim 1, wherein the first layer and the second layer have a total thickness of 2 to 15 μm.

6. The metal joined body according to claim 1, wherein a ratio (t1/w) of a thickness (t1) of the first layer to a width (w) of the first protrusions is 1 to 20.

7. The metal joined body according to claim 1, wherein the first layer is a solid-liquid interdiffusion layer generated such that a liquid phase of the aluminum base body and a solid phase of the iron base body react in a joint portion.

8. The metal joined body according to claim 1, wherein the iron base body is a steel sheet, the aluminum base body is an aluminum alloy sheet, and the steel sheet and the aluminum alloy sheet are spot-joined.

9. The metal joined body according to claim 8, wherein the steel sheet has a surface treatment layer on the aluminum alloy sheet side.

10. The metal joined body according to claim 1, wherein the metal joined body is a panel for a vehicle.

11. A production method for obtaining the metal joined body according to claim 1, the production method comprising:

a heating step of energizing an iron base body and an aluminum base body to be joined from electrodes to generate a liquid phase of the aluminum base body on a solid phase of the iron base body in a joint portion of the iron base body and the aluminum base body, the electrodes being in pressure contact with outer surfaces of the iron base body and the aluminum base body; and a cooling step of cooling the joint portion after the heating step.

12. The production method for the metal joined body according to claim 11, wherein the heating step is performed by monotonically increasing a current value with respect to an energization time of the electrodes.

13. The production method for the metal joined body according to claim 12, wherein the current value is 10 to 15 kA and the energization time is 200 to 500 ms.

14. The metal joined body according to claim 1, wherein the first protrusions comprise 20 to 50 protrusions per a reference length (50 μm) of the first layer.

15. The metal joined body according to claim 1, wherein the first protrusions comprise 30 to 45 protrusions per a reference length (50 μm) of the first layer.

* * * * *